No. 638,822. Patented Dec. 12, 1899.
W. B. TURNER.
RAILROAD BICYCLE.
(Application filed June 23, 1899.)
(No Model.)
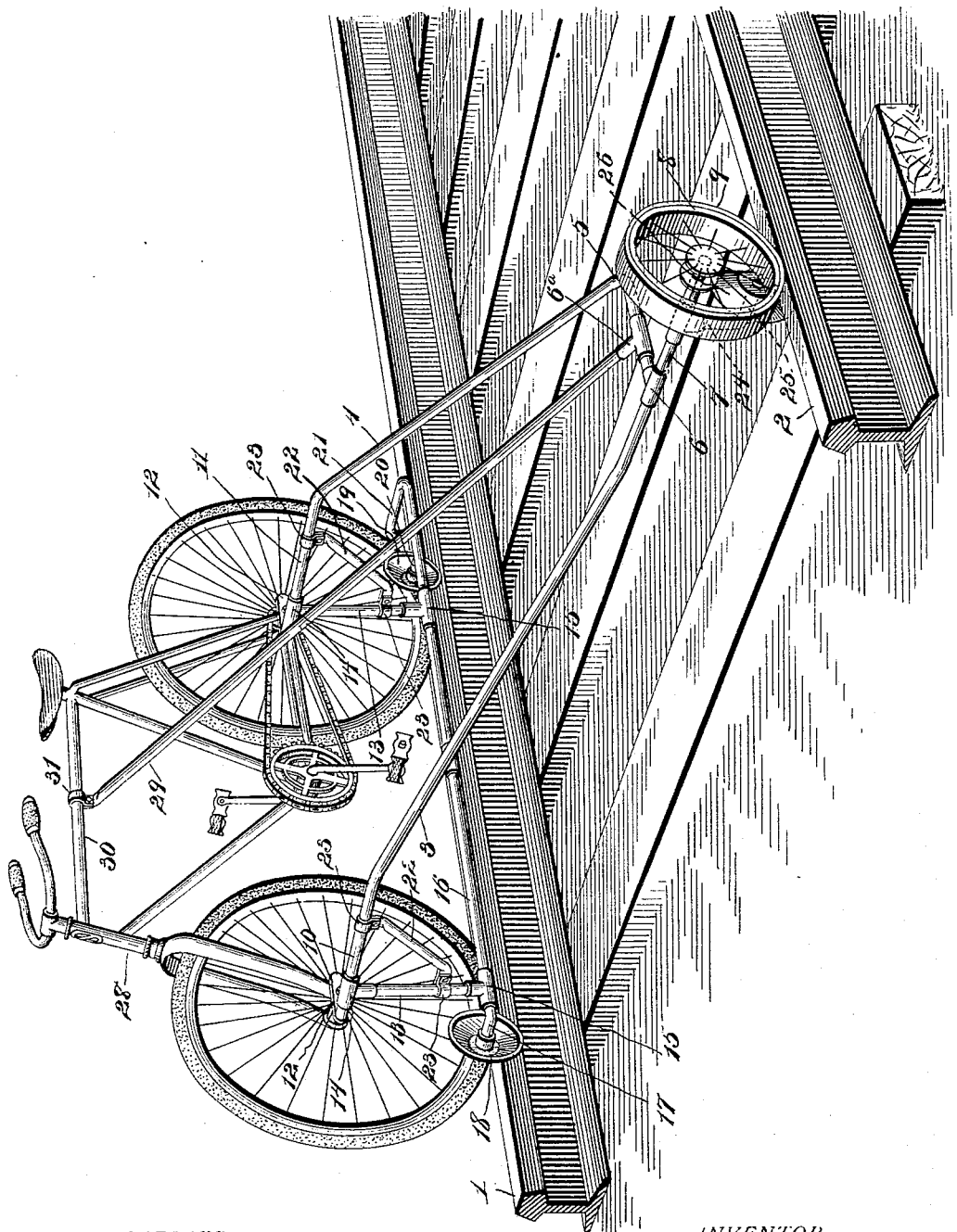
WITNESSES
Louis D. Heinrichs.
J. V. McCleary,
INVENTOR
William B. Turner
By Victor J. Evans
Attorney

UNITED STATES PATENT OFFICE.

WILLIAM B. TURNER, OF ROSS, TEXAS.

RAILROAD-BICYCLE.

SPECIFICATION forming part of Letters Patent No. 638,822, dated December 12, 1899.

Application filed June 23, 1899. Serial No. 721,608. (No model.)

*To all whom it may concern:*

Be it known that I, WILLIAM B. TURNER, a citizen of the United States, residing at Ross, in the county of McLennan and State of Texas, have invented certain new and useful Improvements in Railroad-Bicycles; and I do declare the following to be a full, clear, and exact description of the invention, such as will enable others skilled in the art to which it appertains to make and use the same, reference being had to the accompanying drawing, and to the figures of reference marked thereon, which forms a part of this specification.

This invention relates to railroad-bicycles; and the purpose of the same is to provide means for supporting a bicycle of ordinary form on a rail in a positive and invariable manner, and thereby conveniently utilize a track-rail as a riding-surface, and, further, to avoid the necessity of specially constructing the bicycle by having the supporting parts detachably connected thereto, which also serves as a convenient means of employing any one of the standard makes of bicycles.

The invention consists, primarily, of a frame composed of connected members, a portion of which at one end are diverged and attached to the spindles or journals of the wheels of the bicycle and having arms depending therefrom secured to a guard member carrying small wheels to engage the inner portions of the rail on which the bicycle travels, the opposite portion of the said frame members being converged and supporting a reduced track-wheel and an adjacent flange-wheel, a reach extending from a part of the bicycle-frame to the converged portion of the frame members adjacent the said track-wheel.

The invention further consists of the details of construction and arrangement of the several parts, which will be more fully hereinafter described and claimed.

The accompanying drawing illustrates a perspective view of a portion of a railroad-track, showing a bicycle supported on one of the rails by means of the improved frame attachment.

In the drawing the numerals 1 and 2 designate the opposite track-rails, which are of the ordinary and well-known form of construction and having the usual gage. The frame comprises front and rear transverse bars 3 and 4, which are tubular and preferably formed of lengths of gas or other pipe connected up by couplings of suitable form. Both of the bars 3 and 4 are diverged toward the ends, which are attached to the bicycle and depressed and converged toward the opposite terminations thereof, the bar 4 being bent, as at 5, and attached to a T-coupling 6 on the bar 3. From the point of attachment of the bar 4 to the bar 3 the latter is continued and forms a spindle 7 for a track-wheel 8, having a broad tread and an elastic tire 9. In the transverse direction, generally stated, the bar 3 is approximately straight or lies in a straight plane; but the bar 4 from the beginning of its depression gradually runs obliquely toward the bend 5 thereof. At their diverged ends the bars 3 and 4 are horizontally straight, as at 10 and 11, and parallel and have terminal right-angular arms 12, which are slotted to permit of their attachment to the spindles or hubs of the bicycle to hold the said bars in firm connection with said bicycle. The straight portions of the bars 10 and 11, adjacent to their outer ends or near the clips 12, are made adjustable, so that they may be lengthened or shortened, if desired, though under ordinary circumstances the said bars will be of a length coextensive with the ordinary railroad-gage or distance between track-rails, which is now almost completely uniform. The only advantage of incorporating the adjustable features set forth is to accommodate the application of the frame to narrow-gage tracks, and in accomplishing such adjustment it might be obtained through the couplings for the bars, though it is preferred that the lengthening and shortening of the latter be carried on at the points heretofore indicated. Adjacent the terminals of the diverged ends of the bars 3 and 4 depending bars or hangers 13 are connected by T-couplings 14, and to the lower ends of said hangers, by means of other T-couplings 15, a guard-bar 16 is secured and horizontally disposed, the front end of said guard being bent out at an angle, as at 17, to provide a bearing for a retaining-wheel 18, having a beveled periphery and adapted to bear against the side of the flange of the rail. A similar retaining-wheel 19 is carried by a stub connection 20 adjacent the rear end of the guard 16 and is of a form similar to the wheel 18. The rear portion of the guard terminates in a laterally-projecting arm 21, which extends across the rail and serves to support the bicycle upon the rail in case the wheels accidentally leave the rail. To make the frame applicable to bicycles having hubs or spindles at varying elevations, the hangers 13 are attached to the bars 3 and 4 by diagonal braces 22 through the medium of clamps 23 on the said hangers and bars. The braces 22 are adjustable by moving these clamps, which will spring the hangers 13 slightly, and thus vary the gage. The hangers 13 must also have a movable connection to permit the clips 12 to be elevated or depressed, and consequently portions of the hanger are moved in their couplings by screwing or unscrewing them.

Depending from the extended portion of the bar 3, which forms a spindle for the wheel 8, is another hanger 24, with a lower outturned end 25, carrying a retaining-wheel 26, similar in all particulars to the wheels 18 and 19 and adapted to bear against the inner side of the head of the rail 2. Through the triangular position of the several retaining-wheels, as set forth, the entire frame as well as the track-wheel 8 and bicycle are maintained in position on the track-rails, and danger of displacement, either in rounding curves through centrifugal action or from other causes, is obviated.

The bicycle used in connection with the frame, as previously indicated, is of any ordinary construction, and preferably of one of the standard grades now commonly known in the market. If the support of the bicycle were solely through the clips 12, the steadiness of motion would be considerably impaired in view of the strain incident to the propulsion of the machine and also the weight of the rider on the saddle. To overcome the tendency to break away from the clips 12, a reach-bar 29 is employed and arranged diagonally in an upward direction from the T-coupling 6ª, where it is attached at one end to the horizontal bar 30 of the bycycle 28, to which it is connected at its opposite end by means of a clamp 31 on the said end of the bar 29.

When the machine is not in use, the frame may be readily detached from the bicyle and the parts stored separately, and in setting up the device on a railroad-track the frame may be first positioned and the bicycle connected to the parts heretofore described and by the means specified. The frame as an entirety may be made light and durable, and through the couplings of the several bars the parts of the frame may be disconnected and reduced to a small bulk for transportation and at a minimum cost. It is not necessary that the bicycle be furnished with the frame in view of the fact that said frame can be applied to any form of bicycle now in use, and this materially reduces the cost of manufacture, and it is therefore within the province of the owner of a bicycle to purchase the attachment and apply it at will. The several bearings of the wheels at different points on the frame may be supplied with antifriction-balls or other analogous devices to make said parts run easily, and in adapting the improvement to various uses it may be necessary to change the proportions, dimensions, and minor details of construction. Such changes will be made and utilized that are within the scope of the invention and without sacrificing any of the advantages incident thereto.

It will be noted that the wheels 18, 19, and 26 are sufficiently elevated to prevent their striking the rail-spikes and to permit them to readily pass over frogs and crossings.

In practice the upper end of the reach-bar 29 is connected to the frame-bar 30 near the steering-post to be out of the way of the rider's knees; but said reach-bar is shown in the drawings as secured at the center of the bar 30 to avoid concealing any part of the wheel 19 and its supports.

Having thus described the invention, what is claimed as new is—

1. The combination with an ordinary bicycle of a frame, comprising front and rear diverging bars having terminals detachably connected to the spindles or hubs of the bicycle and depressed at their opposite ends, hangers depending from said bars; a guard supported at the lower ends of said hangers and carrying retaining-wheels; a track-wheel carried by said bars adjacent to the end farthest from the bicycle, and a reach-bar arranged centrally between the diverging bars and removably attached to a portion of the frame of the bicycle.

2. In a railroad-bicycle, the combination with a bicycle, of a frame detachably secured thereto, comprising diverging bars and a central reach-bar; hangers depending from said diverging bars; a guard secured at the lower ends of said hangers, retaining-wheels carried by said guard; a track-wheel supported by the end of the frame farthest from the bicycle, and a retaining-wheel supported by a hanger adjacent to said track-wheel.

3. In a railroad-bicycle, the combination with a bicycle, of a frame comprising divergging bars, and a central reach-bar detachably connected at one end to various points of the bicycle-frame, hangers depending from said diverging bars, a guard secured to the lower ends of said hangers, a track-wheel carried by the opposite end of the said frame, and retaining-wheels to engage the inner sides of rails supported by portions of the said frame and located adjacent the bicycle and said track-wheel.

4. In a railroad-bicycle, the combination with a bicycle, of a frame detachably connected thereto, and comprising diverging bars, and a central reach-bar; hangers depending from said diverging bars; a guard supported by said hangers and having its rear end extended laterally across the track-rail; retaining-wheels carried by said guard; a track-wheel carried by the end of the frame opposite to that attached to the bicycle and a retaining-wheel for said track-wheel.

In testimony whereof I affix my signature in presence of two witnesses.

WILLIAM B. TURNER.

Witnesses:
A. J. SMITH,
W. C. DUFFEL.